(12) United States Patent  
Buhrke et al.

(10) Patent No.: US 7,938,206 B2
(45) Date of Patent: May 10, 2011

(54) MODULAR TRANSMISSION ASSEMBLY FOR AN AGRICULTURAL OR INDUSTRIAL UTILITY VEHICLE

(75) Inventors: Frank Buhrke, Birkenau (DE); Bryan K. Buerkle, Waterloo, IA (US)

(73) Assignee: Deere & Company, Moline, IL (US)

( * ) Notice: Subject to any disclaimer, the term of this patent is extended or adjusted under 35 U.S.C. 154(b) by 324 days.

(21) Appl. No.: 11/623,825

(22) Filed: Jan. 17, 2007

(65) Prior Publication Data
US 2008/0169109 A1 Jul. 17, 2008

(51) Int. Cl.
*B60K 17/28* (2006.01)
(52) U.S. Cl. ........................ 180/53.1; 180/53.3; 180/53.8
(58) Field of Classification Search .................. 180/53.1, 180/53.3
See application file for complete search history.

(56) References Cited

U.S. PATENT DOCUMENTS

| | | | | |
|---|---|---|---|---|
| 3,023,818 | A * | 3/1962 | Miller et al. | 172/439 |
| 4,738,461 | A * | 4/1988 | Stephenson et al. | 280/400 |
| 5,947,218 | A * | 9/1999 | Ishimaru | 180/53.1 |
| 6,003,391 | A * | 12/1999 | Kojima et al. | 74/15.66 |
| 6,048,161 | A * | 4/2000 | Merlo et al. | 414/680 |
| 6,267,189 | B1 * | 7/2001 | Nielsen et al. | 180/53.1 |
| 7,325,635 | B2 * | 2/2008 | Yamaguchi et al. | 180/53.1 |

* cited by examiner

*Primary Examiner* — Paul N Dickson
*Assistant Examiner* — Nicole Verley

(57) ABSTRACT

A modular transmission assembly is provided for an agricultural or industrial utility vehicle especially for a tractor. The transmission assembly comprises a housing member with at least three attachment sites for components of a three point hitch arrangement. The attachment sites being provided at the housing member for attaching at least two draft links and at least one upper link. The transmission assembly further comprises a power take off transmission module being adapted to the housing member, the transmission module having at least two different gear ratios.

12 Claims, 4 Drawing Sheets

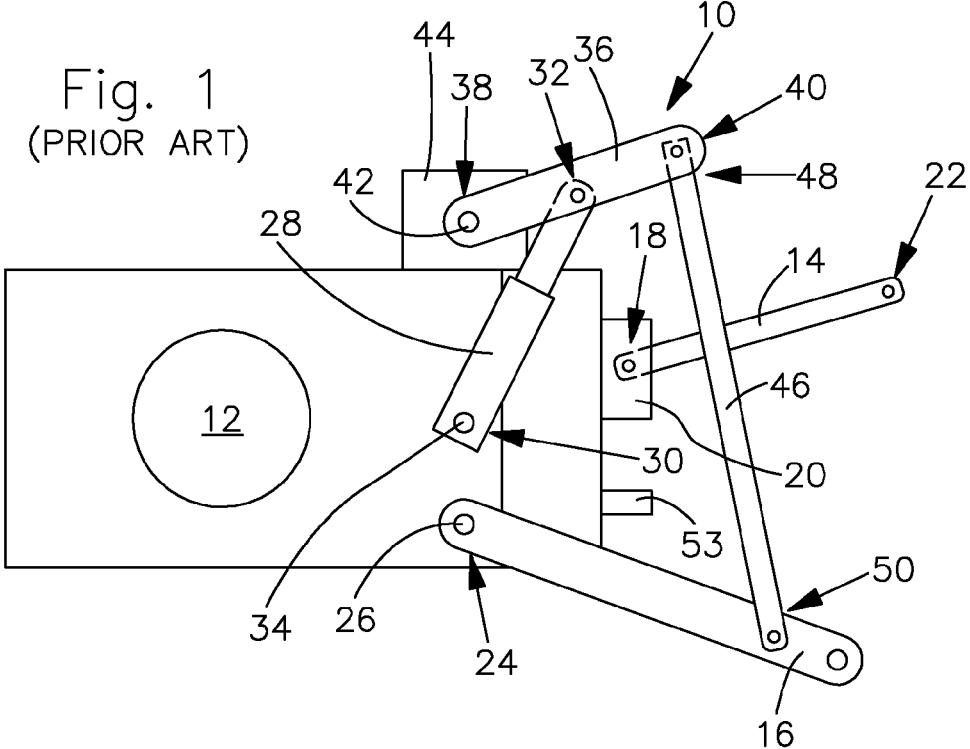
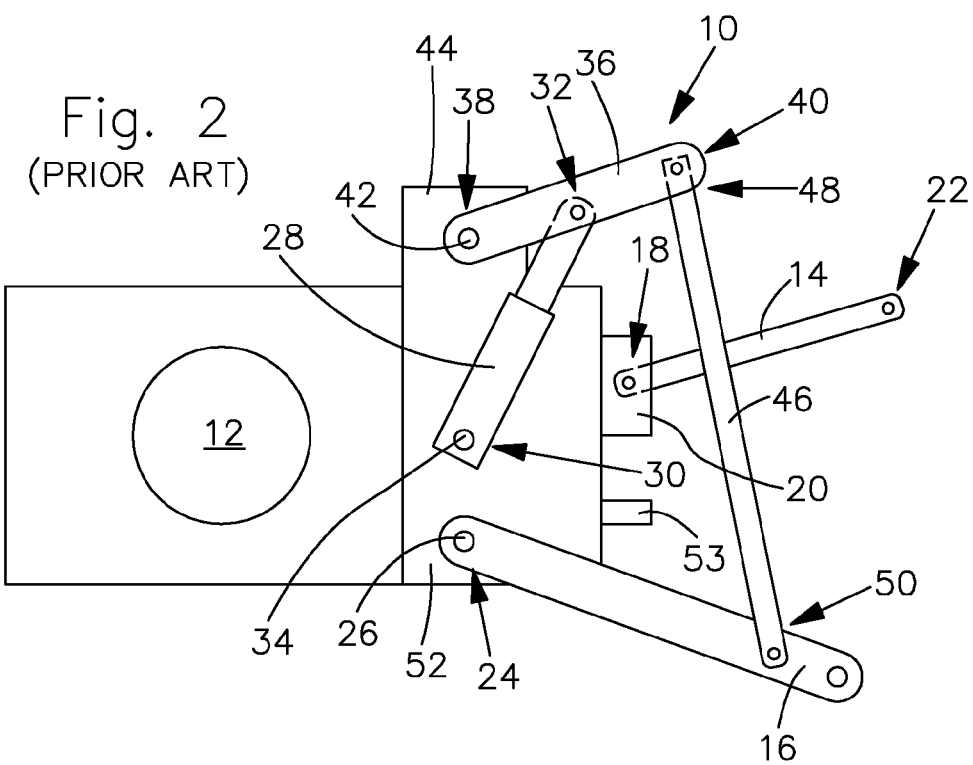

MODULAR TRANSMISSION ASSEMBLY FOR AN AGRICULTURAL OR INDUSTRIAL UTILITY VEHICLE

FIELD OF THE INVENTION

The present invention relates generally to transmission assemblies for agricultural or industrial utility vehicles. More particularly, the present invention relates to a modular transmission assembly for a tractor.

BACKGROUND OF THE INVENTION

Agricultural or industrial utility vehicles and especially tractors are typically provided with an interface for adapting an implement to the vehicle in order to perform a work operation. Such an implement could be a plow for example. Such an interface is usually realized by a three point hitch arrangement, comprising two tower draft links and one upper link. As example of such a three point hitch arrangement is known e.g. from FIG. 1 of U.S. Pat. No. 6,830,110.

The attachment sites on the vehicle side for the two draft links and the upper link can be provided at the differential housing or at a hitch- to PTO- (power take off)-housing of the vehicle. An attachment site in the sense of the present invention is especially a site of the housing member onto which a component of the three point hitch arrangement can be mounted or attached to. In this respect, an attachment site can also be referred to as a mounting site.

Furthermore, the three point hitch arrangement usually comprises a rockshaft. The rockshaft is a part which usually is located in a horizontal direction and mounted for rotation within a rockshaft housing or a rockshaft journal. One rocker arm is mounted on the left-hand end of the rockshaft and another rocker arm is mounted on the right-hand end of the rockshaft. Each rocker arm comprises a first end, which is mounted fixed for rotation to the rockshaft, and a second free end, which is spaced apart from the first end. A pair of lift links are provided, each one having an upper end which is pivotally coupled to a draft link respectively. Furthermore, right- and left-hand lift cylinders are provided each one having an upper end which is pivotally coupled to a rocker arm and each having a lower end which is pivotally coupled to the vehicle frame or a housing of the vehicle. Thus, the rockshaft can also be located at the hitch- or PTO-housing or in an additional rockshaft housing, the rockshaft housing mounted on top of the differential case of the vehicle.

This means that usually the single components of the three point hitch arrangement are attached to different components of the vehicle, e.g. the lower draft links are mounted to the frame of the vehicle whereas the upper link and the rockshaft are mounted to the differential case housing. This might result in unequal stress load on those vehicle components caused by a transfer of forces from the implement to the vehicle.

Usually, the PTO transmission is located in the main transmission of the vehicle at the rear end of the vehicle transmission. This means that in a service case related to just the PTO transmission, the housing of the main transmission of the vehicle has to be opened and the relevant parts of the PTO transmission have to be made accessible or the complete main transmission has to be disassembled in order to access the PTO transmission components. This is time consuming and costly.

Accordingly, there is a clear need in the art for providing a three point hitch arrangement as well as a PTO transmission avoiding the aforementioned problems.

FIG. 1 is a schematic representation of a side view of the single components of known prior art a three point hitch arrangement 10 being attached to a differential case 12. The three point hitch arrangement 10 comprises one upper link 14 as well as two lower draft links 16, of which only one can be seen because of the side view of FIG. 1. The upper link 14 comprises a first end 18, which is pivotally engaged with an attachment site 20. The attachment site 20 is located at the rear end of the housing of the differential case 12. The upper link 14 comprises a second end 22, which can be engaged with an implement, the implement is not shown in FIGS. 1 to 5. The draft link 16 comprises a first end 24, which is pivotally coupled to the housing of the differential case 12 at the attachment site 26. The lift cylinder 28 comprises a first end 30 and a second end 32. The first end 30 of the lift cylinder 28 is pivotally connected to the housing of the differential case 12 at the attachment site 34. The second end 32 of the lift cylinder 28 is pivotally connected to the rocker arm 36. The rocker arm 36 comprises a first end 38 and a second end 40. The first end 38 of the rocker arm 36 is connected to the rockshaft 42. The rockshaft housing 44 journals the rockshaft 42 for a pivoting/rotational movement around the longitudinal axis of the rockshaft 42. The rockshaft end 40 of the rocker arm 36 is pivotally connected with the lift link 46. The lift link 46 comprises a first end 48 and the second end 50. The first end 48 of lift link 46 is pivotally connected to the second end 40 of the rocker arm 36. The second end 50 of lift link 46 is pivotally connected with the draft link 16.

Because of the side view of the three point hitch arrangement 10 with its components and the differential case 12, only one rocker arm 36, one lift cylinder 28, one lift link 46 and one draft link 16 is shown. Those elements are also provided on the other side of the three point hitch-arrangement 10, however, they can't be seen from the side view shown in FIG. 1. By changing the length of the left cylinder 28, the rocker arm 36 can be rotated/turned around the longitudinal axis of rockshaft 42. Therefore, an implement being attached to the three point hitch arrangement 10 can be raised or lowered. The three point hitch arrangement 10 being attached to a differential case 12 shown in FIG. 1 is known from the current John Deere 6000 and 7000 series tractors.

FIG. 2 is a schematic representation of a side view of another three point hitch arrangement 10 being attached to a differential case 12 known from prior art. The three point hitch arrangement 10 of FIG. 2 comprises essentially the same components as the one of FIG. 1, namely one upper link 14, two lower draft links 16, two lift cylinders 28, two rocker arms 36, a rockshaft 42 and two lift links 46. These components have essentially the same functionality as the ones shown in FIG. 1. However, the attachment sites 26 for the draft links 16 and the attachment sites 34 for lift cylinders 28 are provided at the housing member 52. The housing member 52 journals the rockshaft 42. Therefore, the rockshaft housing 44 is integrated into the housing member 52. The PTO shaft is indicated by reference numeral 53.

The power take off transmission is neither shown in FIG. 1 nor in FIG. 2. However, the power take off transmission of the embodiments of FIGS. 1 and 2 is located in the main transmission, which is also not shown in FIGS. 1 and 2. The three point hitch arrangement 10 being attached to a differential case 12 shown in FIG. 2 is known from the current John Deere 8000 series tractors.

SUMMARY OF THE INVENTION

In view of the foregoing, it is an object of the invention to provide an improved PTO-transmission for a vehicle.

Another object of the invention is the provision of an improved three point hitch arrangement for a vehicle.

The foregoing and other objects of the invention together with the advantages thereof over the known art which will become apparent from the detailed specification which follows are attained by a modular transmission assembly comprising a housing member with at least three attachment or mounting sites for components of a three point hitch arrangement. The attachment sites being provided at the housing member for attaching at least two draft links and at least one upper link of the three point hitch arrangement. The transmission assembly further comprises a power take off transmission module being adapted to the housing member, the transmission module having at least tow different gear ratios.

According to the present invention, the transmission assembly is formed by adapting or integrating the power take off transmission assembly module in the housing member or to the housing member. The advantage of combining the power take off transmission module to the housing member is, that the transmission assembly can be pre-assembled. By these means, the transmission assembly can be produced in a location other than the location where the main transmission of the vehicle or the vehicle itself is manufactured. The transmission assembly could for example be manufactured at a supplier. The entire transmission assembly can be tested in a condition not being assembled to the other vehicle components so that the function can be checked before a final assembly. Therefore, the entire transmission assembly can be regarded as one module. Besides these manufacturing and assembling advantages, the serviceability of the transmission assembly is improved, since the transmission assembly can be repaired or replaced more easily than having the PTO transmission integrated in the main transmission. For example the complete transmission assembly could be dismounted from the vehicle, with the consequence, that only the components which have to be serviced or repaired need to be dismounted and therefore can be accessed easier and/or faster. The transmission assembly could be replaced as a whole, and therefore the downtime of the vehicle can be minimized. The replacement has the further advantage, in the another transmission assembly comprising other options can be mounted to the vehicle.

In a preferred embodiment, at least one component of a three point hitch arrangement is adapted to engage and attachment site of the housing member. In particular, at least one component of a three point hitch arrangement is adapted to engage one of at least three attachment sites of the housing member. In this case, such a component would be an upper link or one of the two lower draft links. Other examples of such components are: a rockshaft element, a lift actuator, a drawbar device, a piton hitch, a ball hitch, a long or short hitch bracket, a draft bar or a sensor for measuring draft forces transferred from an implement to the vehicle.

According to a preferred embodiment of the present invention, an attachment site is adapted for connecting a rockshaft element to the housing member. Such a rockshaft element can comprise a rockshaft, rocker arms and/or a rockshaft housing. The rockshaft housing could comprise journals for the rockshaft or elements carrying journals for the rockshaft.

According to a further embodiment, an attachment site is adapted for connecting a lift actuator to the housing member. The lift actuator has a first end and a second end. The first end of the lift actuator is connected with the housing member at the attachment site of the lift actuator. The second end of the lift actuator is connected with the rockshaft element and in particular with a rocker arm. Preferably two lift actuators are provided, one on the left hand side and the other on the right hand side of the three point hitch arrangement. The lift actuator could comprise e.g. a hydraulic cylinder.

An attachment site could be adapted for connecting a drawbar device to the housing member. The drawbar device could comprise at least one drawbar and a drawbar support member. The drawbar support member is attachable to the attachment site of the drawbar device.

In a preferred embodiment, the housing member is one-piece. To this housing member the components of the three point hitch arrangement as well as the power take off transmission module are adapted. This one-piece housing member comprises the at least three attachment sites. The one-piece design therefore related to more or less the complete housing member. Alternatively at least a portion of the housing member having at least two attachment sites for components of the three point hitch attachment is one-piece. According to this alternative, more than one portion of the housing member is provided. Such a portion of the housing member could be adapted to another portion of the housing member comprising further attachment sites for other components of the three point hitch-arrangement.

Preferably, the housing member is removably adapted to a housing of another transmission module or to a vehicle frame or to a vehicle component. The fact, that the housing member is removably adapted to a component or an element of the vehicle emphasizes the modularity of the transmission assembly. This allows that the transmission assembly can easily be removed as one complete assembly from the vehicle, if e.g. service or repair work at the transmission assembly has to be performed. Then the relevant components of the transmission assembly can easily be accessed. The replacement of the complete transmission assembly by another transmission assembly can be done in a short period of time. Therefore, service- or maintenance time of the complete vehicle can be shortened, reducing the repair time of the vehicle.

Preferably, the housing member comprises means for providing further three point hitch arrangement options. Such means could comprise one element of the group of the following items: a piton hitch, a ball hitch, a long or short hitch bracket.

At least one sensor could be provided. The sensor is configured or designed for measuring draft forces transferred from an implement to the vehicle. The at least one sensor could be provided at an attachment site for a draft link or at a shaft of the rockshaft element.

Furthermore, the housing member could comprise means for measuring a fill level of a fluid being located in a transmission sump. The transmission sump could be the sump of a main transmission of the vehicle, wherein the modular transmission assembly—and especially the housing member of the transmission assembly—is mounted from the rear side of the vehicle to the housing of the main transmission. The measuring means could comprise a dip stick or an oil gauge. The measuring means could also comprise an electrically based fluid level sensor. The housing member could also comprise a filler neck for filling a fluid into a fluid circuit.

The housing member preferably comprises a power take off shield device for safety reasons. An attachment site for the power take off shield device is therefore provided at the housing member, such that the power take off shield device can removably be mounted to the housing member.

The attachment components could comprise at least one link member having a first end and a second end. The first end of the link member is connected with the rockshaft element, in particular with a rocker arm. The second end of the link member of is connected with the draft link. Both connections of the link members are pivotal for allowing a relative pivot movement between the rocker arm and the link member and allowing a relative pivot movement between lower draft link and the link member. Alternatively or additionally, the attachment components comprise a draft bar.

In a preferred embodiment, the power take off transmission module comprises a clutch, such of a dry or a wet type. The power take off transmission module could also comprise a brake and/or a shifting device. With the shifting device, the power take off transmission module can be shifted between different gear ratios. The power take off transmission module could also comprise at least one speed sensor for sensing the speed of a shaft of the power take off transmission module. The power take off transmission module could comprise a lube distribution system. The lube distribution system could comprise a pump. The pump is configured to distribute or pump lube fluid within the transmission, especially within the power take off transmission module. The power take off transmission module could comprise a valve for modulating pressurized fluid, and wherein a shifting device or a clutch of the power take off transmission module is operated by the pressured fluid as a function of an operating status of the valve.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein:

FIG. 1 is a schematic representation of a side view of a three point hitch arrangement being attached to a differential case of a vehicle known from prior art;

FIG. 2 is a schematic representation of a side view of another three point hitch arrangement being attached to a differential case of a vehicle known from prior art;

DESCRIPTION OF THE PREFERRED EMBODIMENT

Figure 3:
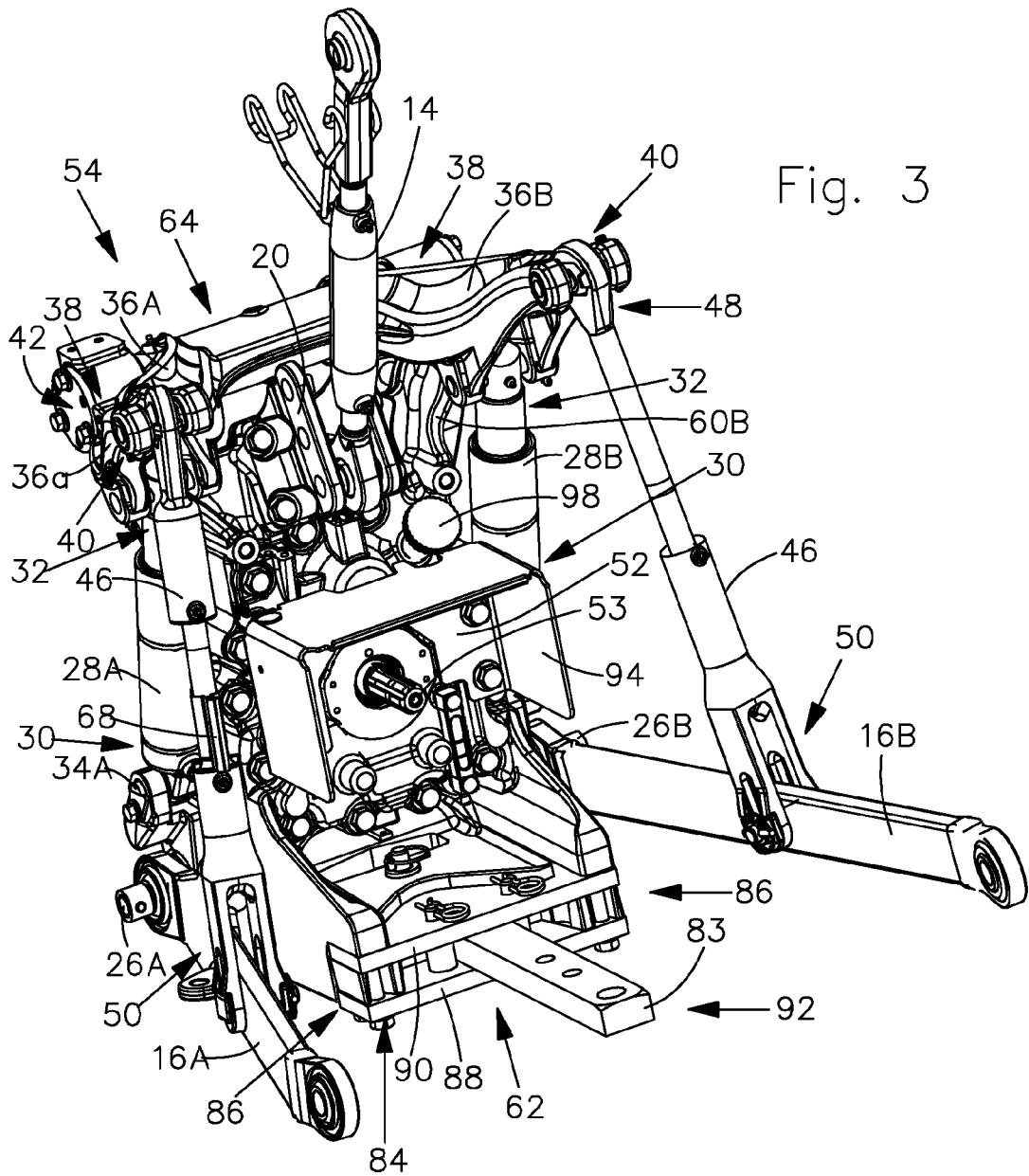
FIG. 3 is a three-dimensional perspective view of a first embodiment according to the present invention seen from one point of view.
Figure 4:
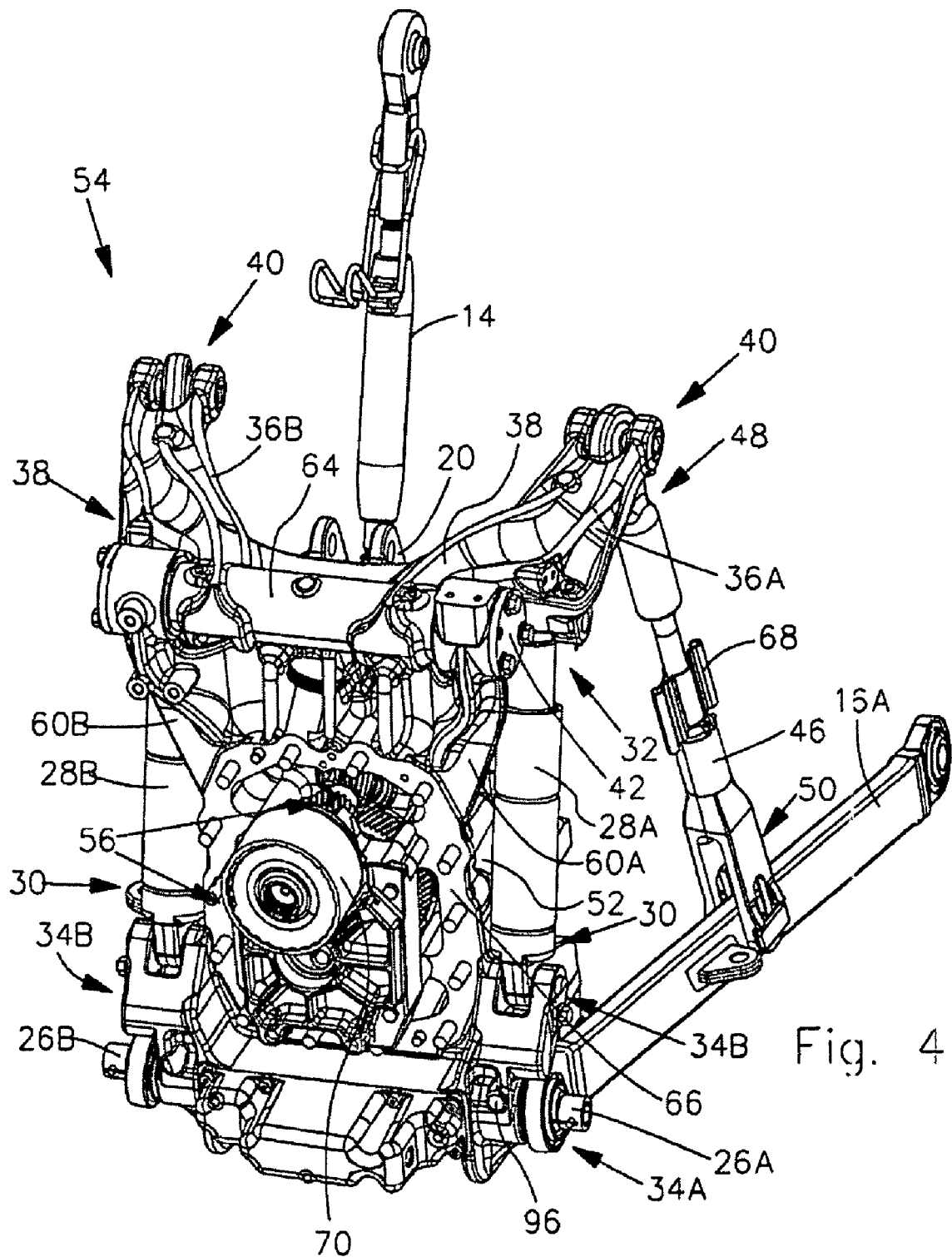
FIG. 4 is another three-dimensional perspective view of the embodiment according to FIG. 3 seen from another point of view; and, FIG. 5 is a sectional view through a modular transmission assembly according to the present invention.
Figure 5:
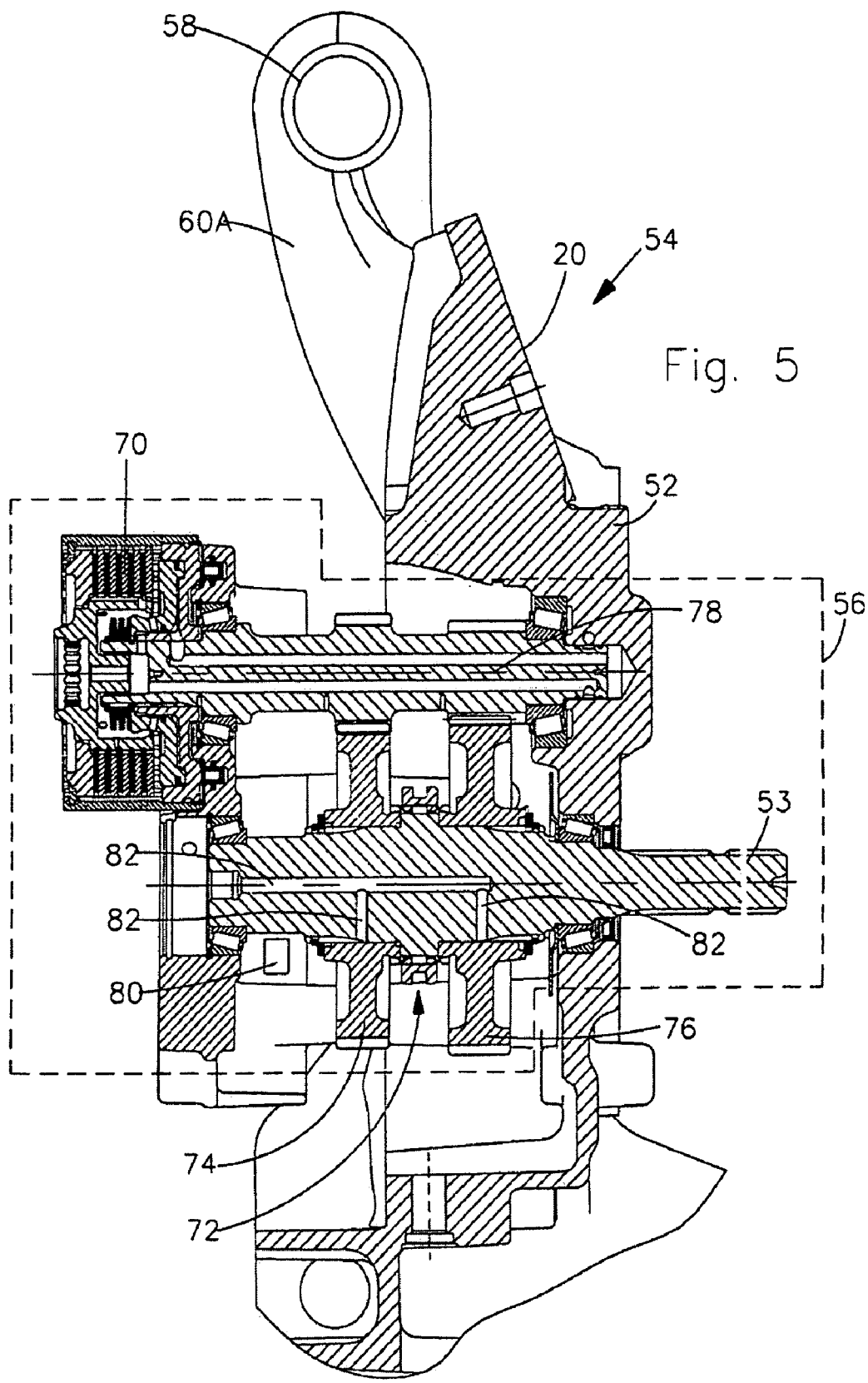

With reference now to FIGS. 3 to 5 it can be seen that the modular transmission assembly according to the present invention is designated generally by the numeral 54. The modular transmission assembly 54 comprises a housing member 52 with at least three attachment or mounting sites 20, 26A and 26B for components of a three point hitch arrangement 10. The attachment sites 20, 26A and 26B are provided at the housing member 52. The attachment sites 26A and 26B are provided for attaching two draft links 16A, 16B. The attachment site 20 is provided for attaching an upper link (not shown in FIGS. 3 to 5, but in principal similar to an upper link 14 of FIG. 1 or 2). The transmission assembly 54 further comprises a power take off transmission module 56 being adapted to the housing member 52. The transmission module 56 has at least two different gear ratios.

In general, one component of a three port hitch arrangement 10 is adapted to engage an attachment site of the housing member 52. In particular, two draft links 16A, 16B are adapted to engage the attachment site 26A, 26B located at opposite sides of the housing member 52, respectively. The first end 30 of each lift cylinder 26A, 26B is adapted to engage the attachment site 34A, 34B respectively. The attachment sites 34A, 34B are located at opposite sides of the housing member 52. FIG. 5, the journal 58 is provided by the elements 60A, 60B located on both sides of the housing member 52. The elements 60A, 60B are connected to the housing member 52 in a one-piece fashion.

The first end 38 of each rocker arm 36A, 36B is fixed for rotation with rockshaft 42. In FIGS. 3 and 4, the left rocker arm 36A and the right rocker arm 36B is shown in different positions respectively, indicating an upper and a lower position of each rocker arm 36A, 36B. However, since the bracket-type or U-shaped arrangement consisting of both rocker arms 36A, 36B and their middle connection part—indicated by reference numeral 64—is of one piece, a situation shown in FIGS. 3 and 4 won't exist in reality. Both rocker arms 36A, 36B and the rockshaft 42 usually are located such that their longitudinal axes are located in the same plane.

There is an attachment site 34A and 34B provided in the lower portion of housing member 52 being adapted for connecting a lift actuator—in particular the lift cylinder 28A, 28B respectively—to the housing member 52. Each lift cylinder 28A, 28B has a first end 30 and a second end 32. The first end 30 of each lift cylinder 28A, 28B is connected with the housing member 52 at the attachment site 34A, 34B. The second end 32 of each lift cylinder 28A, 28B is connected with a rocker arm 36A, 36B respectively. As can be seen in FIGS. 3 and 4, two lift cylinders 28A, 28B are provided, one on the left hand side and the other one on the right hand side of the three point hitch arrangement 10.

The housing member 52 is one-piece. The components of the three point hitch arrangement 10 as well as the power take off transmission module 56 are adapted to this housing member 52. The one-piece design therefore relates to more or less the complete housing member 52.

The housing member 52 shown in FIGS. 3 to 5 is removably adapted to a housing of another transmission module of the vehicle (not shown in FIGS. 3 to 5). The housing member 52 is removably adapted with the interface surface 66, which can be seen in FIG. 4. This allows that the transmission assembly 54 can easily be removed as one complete assembly from the vehicle, e.g. for service or repair purposes. The relevant components of the transmission assembly 54 can easily be accessed, especially the components of the power take off transmission module 56.

The attachment components of the three point hitch arrangement 10 comprise two link members 46, each having a first end 48 and a second end 50. In FIGS. 3 and 4, only one link member 46 is shown. The first end 48 of each link member 46 is connected with the rocker arm 36B. The second end 50 of each link member 46 is connected with a draft link 16B. The second link member—not shown—is connected to rocker arm 36A, 36B and the link member 46 and allowing a relative pivotal movement between lower draft link 16A, 16B and the link member 46. The length of the link member 46 can be adjusted manually by using the length adjusting element 68.

The power take off transmission module 56 comprises a wet type clutch 70. The power take off transmission module also comprises a shifting device 72. With the shifting device 72, the power take off transmission module can be shifted between different gear ratios. The two different gear ratios are provided by the gears 74, 76, each engaging a toothed portion of shaft 78. The power take off transmission module also comprises a speed sensor 80 for sensing the speed of the power take off shaft 53 of the power take off transmission module 56. The power take off transmission 56 module comprises a lube distribution system, of which channels 82 are shown. Hydraulic fluid can be directed through channels 82 for lubrication of the gears 72, 74 and further elements of the power take off transmission module 56.

If clutch 70 is engaged, shaft 78 is fixed for rotation with a shaft being located on the left hand side of clutch 70, but not shown in FIG. 5. In this condition torque can be transferred from shaft 78 to the power take off shaft 53 via gear 74, if the shifting device 72 is in its left engaged position. If the shifting device 72 is in its right engaged position, torque can be transferred from shaft 78 via gear 76 to power take off shaft 53.

A further example of a component of a three point hitch arrangement 10 is the drawbar device 62. The drawbar device 62 comprises a drawbar 82. The drawbar 82 is supported by the support member 84. An attachment site 86 is adapted for connecting the support member 84 of the drawbar device 62 to the housing member 52. The support member 84 comprises two plates 88, 90, which are substantially arranged parallel to each other. The plate 90 is located above the drawbar 82 and the plate 88 is located below the drawbar 82. Therefore, the drawbar 82 is supported in a horizontal direction by the two plates 88, 90. As can be seen in FIG. 3, the drawbar 82 comprises a rear end 92, to which an implement can be attached. The front end (not shown) of the drawbar 82 and can be fixed to a respective attachment site which is located at a differential case of the vehicle, not shown in FIGS. 3 to 5.

The housing member 52 comprises means for providing further three point hitch arrangement options. Such means could comprise at least one element of the group of the following items: a piton hitch, a ball hitch, a long or short hitch bracket.

At least one sensor could be provided. The sensor being configured or designed for measuring draft forces transferred form an implement to the vehicle. The at least one sensor could be provided at an attachment site for a draft link or at a shaft of the rockshaft element.

Furthermore, the housing member could comprise means for measuring a fill level of a fluid being located in a transmission sump. The transmission sump could be the sump of a main transmission of the vehicle, wherein the modular transmission assembly—and especially the housing member of the transmission assembly—is adapted from the rear side of the vehicle to the housing of the main transmission. The measuring means could comprise a dip stick or an oil gauge 98. The measuring means could even comprise an electrically based fluid level sensor. The housing member could also comprise a filler neck for filling a fluid into a fluid circuit.

The housing member comprises a power take off shield device 94 for safety reasons.

Alternatively or additionally, the attachment components comprise a draft bar. Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth in which they are fairly and legally entitled.

The invention claimed is:

1. A modular transmission assembly for a utility vehicle, the transmission assembly comprising a one piece power take-off (PTO) housing member removably adapted to another transmission, the PTO housing member having at least three attachment sites being provided on the PTO housing member for attaching at least two draft links and at least one upper link of a three point hitch arrangement, the transmission assembly further having only a power take off (PTO) transmission module being integrated with and housed within the one piece PTO housing member, the (PTO) transmission module having at least two different gear ratios.

2. A modular transmission assembly according to claim 1, wherein an attachment site is provided for connecting a rockshaft element to the housing member.

3. A modular transmission assembly according to claim 2, wherein an attachment site is provided for connecting a lift actuator to the housing member, the lift actuator having a first end and a second end, the first end of the lift actuator being connected with the housing member at the attachment site and the second end of the lift actuator being connected with the rockshaft element.

4. A modular transmission assembly according to claim 1, wherein an attachment site is provided for connecting a drawbar device to the housing member, the drawbar device comprising at least one drawbar and a drawbar support member being attachable to the attachment site.

5. A modular transmission assembly according to claim 1, wherein the housing member comprises means for measuring a fill level of a fluid being located in the transmission, the measuring means comprising one of a dip stick or an oil gauge.

6. A modular transmission assembly according to claim 1, wherein the housing member comprises a power take off shield device.

7. A modular transmission assembly according to claim 1, wherein the three point hitch arrangement further comprises at least one link member having a first end and a second end, the first end of the link member being connected with the rockshaft element and the second end of the link member of being connected with the draft link.

8. A modular transmission assembly according to claim 1, wherein the three point hitch arrangement further comprises a draw bar.

9. A modular transmission assembly according to claim 1, wherein the power take off transmission module comprises a clutch.

10. A modular transmission assembly according to claim 1, wherein the power take off transmission module comprises a shifting device for shifting the power take off transmission module between different gear ratios.

11. A modular transmission assembly according to claim 1, wherein the power take off transmission module comprises at least one speed sensor for sensing the speed of a shaft of the power take off transmission module.

12. A modular transmission assembly according to claim 1, wherein the power take off transmission module comprises a lube distribution system.

* * * * *